(No Model.)

T. F. KRAJEWSKI.
Running Gear for Vehicles.

No. 235,785.  Patented Dec. 21, 1880.

Witnesses  
Fred. Haynes  
Thomas E. Birch.

Inventor  
Thomas F. Krajewski  
by his Attorneys  
Brown & Brown

UNITED STATES PATENT OFFICE.

THOMAS F. KRAJEWSKI, OF PATERSON, NEW JERSEY.

RUNNING-GEAR FOR VEHICLES.

SPECIFICATION forming part of Letters Patent No. 235,785, dated December 21, 1880.

Application filed March 29, 1880. (No model.)

*To all whom it may concern:*

Be it known that I, THOMAS F. KRAJEWSKI, of Paterson, in the county of Passaic and State of New Jersey, have invented certain new and useful Improvements in Wheeled Vehicles, of which the following is a specification.

While my improvements may be embodied in any car or wheeled vehicle, certain of them are particularly adapted for cars or vehicles intended for use either upon a railway or upon a common road.

My invention consists in various novel features in the construction of a car or vehicle, whereby I provide for the yielding of the several parts of the car and their adjustment relatively to each other while passing over an uneven surface and turning in sharp curves, and thus prevent the straining of the frame-work and running-gear of the car or vehicle.

Figure 1:
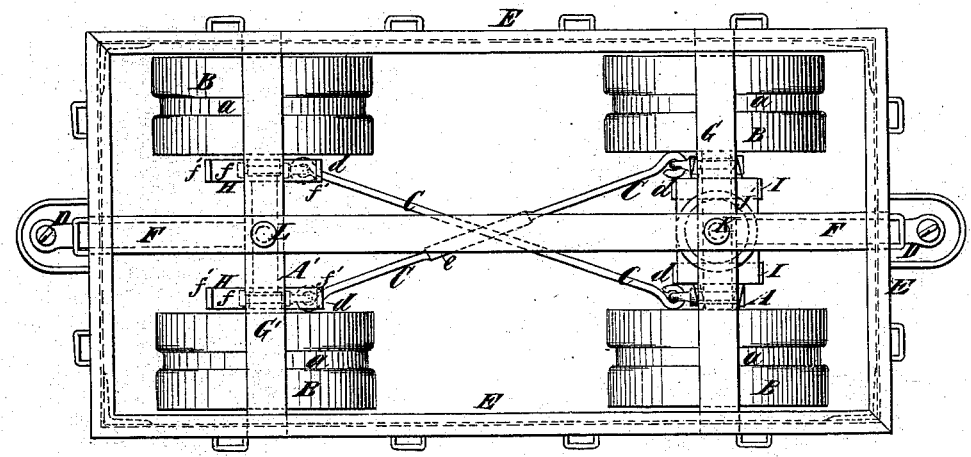
Figure 2:
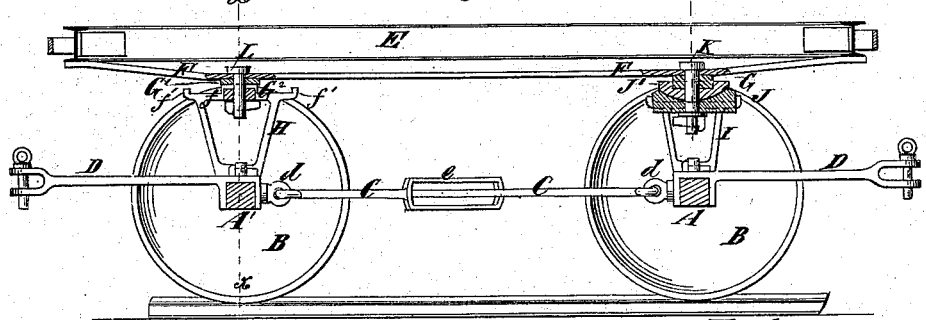
Figure 3:
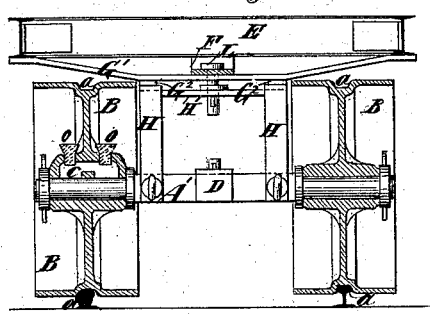
Figure 4:
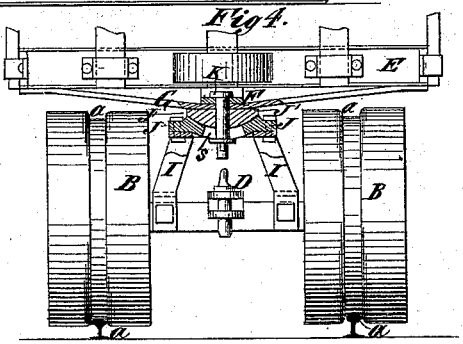

In the accompanying drawings, Figure 1 represents a plan of a platform-car embodying my invention. Fig. 2 represents a longitudinal section through the same. Fig. 3 represents a transverse section of said car upon the dotted line *x x*, Fig. 2; and Fig. 4 represents a partly sectional end view.

Similar letters of reference designate corresponding parts in all the figures.

A A' designate the two axles of the car, and B designates the wheels thereof.

In order to provide for traveling upon ordinary roads the wheels have a broad, flat tread, and to enable them to be used upon rails they are provided with annular grooves or recesses *a* between their edges.

The construction of the wheels with the grooves or recesses *a* forms no part of my present invention, and my improvements are equally applicable to cars or vehicles provided with wheels of any other construction.

In order to provide for the self-oiling of the fixed axles, each wheel is provided in its hub with a cavity or cell, *c*, which is formed in the same piece therewith, which communicates with the bore of the wheel, and which may be filled with waste saturated with oil or other lubricating material.

Oil or other lubricating material may be introduced through holes in the cells or chambers *c*, which are closed by plugs *o*, of wood or other material.

The axles are not rigidly connected with the car-body, but can turn around vertical axes, which pass through their centers. To insure their steadiness when the car is in motion, the axles are connected by means of diagonal bars or rods C, which are attached to the axles at certain distances from their centers by means of joints *d*, which permit of their universal adjustment, and which cross each other, one being provided with a yoke, *e*, through which the other passes, as clearly illustrated in Fig. 2.

The means of making the movement of the two axles dependent upon each other by means of the diagonal rods is old and not of my invention; but a difficulty has been encountered in effecting the radial position of the axles of such four-wheeled vehicles when turning in curves, and to effect this complicated devices have been invented. By my invention this has been accomplished in a simple manner—namely, by attaching a draw-bar directly to the axle, instead of attaching it to the car-body. This is clearly shown in Figs. 1 and 2, where D represents the draw-bars.

If a single vehicle—such as the one represented here—is moving on a railroad-track or on ordinary ground, the tractive force being attached to the end of the draw-bar D will move the axle around the vertical center line whenever the direction of motion is changing, for the draw-bar then acts as a mechanical lever, on the one end of which a force is acting. As soon as the axle takes the position at right angles to the direction of the tractive force it ceases to rotate, and if the tractive force is moving in a circle the axle will take the radial position to this circle, as also will the second axle, as a consequence of the arrangement of diagonal rods C, already mentioned.

If several such vehicles are coupled together and are moving in a curve of a railroad-track, it is evident that all their axles will take radial positions to the curve, or nearly so, inasmuch as the proportions of the lengths of draw-bars and of the distances of axles are made so as to effect this.

As here represented, the car body or platform is composed of a rectangular frame, E, of I-beams, upon which the planking may be laid.

F designates a central longitudinal brace or bar, bolted at the ends to the under side of the frame E; and G G' designate cross braces or bars extending transversely of the frame E, secured at the ends to the under side of said frame and passing under the longitudinal brace or bar F. The cross braces or bars G G' are placed the same distance apart from center to center as the axles A A', and are arranged centrally over the same. A car-platform may be constructed in this manner of great strength and at the same time of light weight.

The means here shown for supporting the car body or platform consists of a saddle composed of two parts, H H, erected upon the axle A', and another saddle composed of two parts, I I, erected upon the axle A. The saddle H H is provided upon its upper surface with two tracks, ways, or side bearings, $f$, extending lengthwise of the vehicle between the wheels, upon which the bearing-plates $G^2$, attached to the cross brace or bar G', may slide; and $f'$ designates stops, to prevent too great a movement of the said plates. The saddle I I support the center bearing composed of the two plates or parts J J', which are, respectively, concave and convex upon their meeting or bearing surfaces. Thus the car body or platform is supported on three points. K designates the center pin passing through the longitudinal brace F and the cross-brace G at their point of intersection, and also through the center plates, J J'. The center pin, L, above the axle A', passes through the longitudinal brace F and the cross-brace G' at their point of intersection, and also through a cross-bar, H', connecting the two parts H H, as shown clearly in Fig. 3.

The concave and convex bearing or meeting surfaces of the center plates, J J', provide for the ready adjustment of the parts of the car when either of the wheels is raised, as in going over uneven ground, thereby preventing the straining of the frame or platform; and the lower center plate, J, is provided with a transverse slot, $s$, as clearly shown in Fig. 4, through which the center pin, K, passes, thus permitting the part J' to move freely thereon.

The ways $f$, upon the saddle H H, permit the car frame or platform to slide thereon when the axles are shifted at an angle to each other, as in turning a curve.

It will be seen that by my invention I provide a strong and light car, adapted for use either upon a railroad or upon common ground, and the parts of which are so constructed and connected that they readily adjust themselves relatively to each other, whether the wheels are upon a regular or an irregular surface, and whether the motion is in a straight line or a curve.

What I claim as my invention, and desire to secure by Letters Patent, is—

1. The combination of two axles, diagonal rods connecting said axles, or other arrangement to permit of their adjustment relatively to each other, a saddle erected upon one axle and provided at its upper surface with two horizontal tracks, ways, or side bearings, one each side of the center pin, and extending lengthwise of the vehicle, upon which the car body or platform may slide or move, substantially as specified.

2. The combination in a car, of two axles, diagonal rods connecting said axles, or other arrangement to permit of their adjustment relatively to each other, a saddle erected upon one axle provided at its upper face with two horizontal tracks, ways, or side bearings between the wheels, and a saddle erected upon the other axle and provided at its upper surface with two plates as center bearings, which are, respectively, concave and convex to allow of an adjustment when running upon an uneven surface, substantially as specified.

THOMAS F. KRAJEWSKI.

Witnesses:
CHANDLER HALL,
E. P. JESSUPS.